Figure 1:
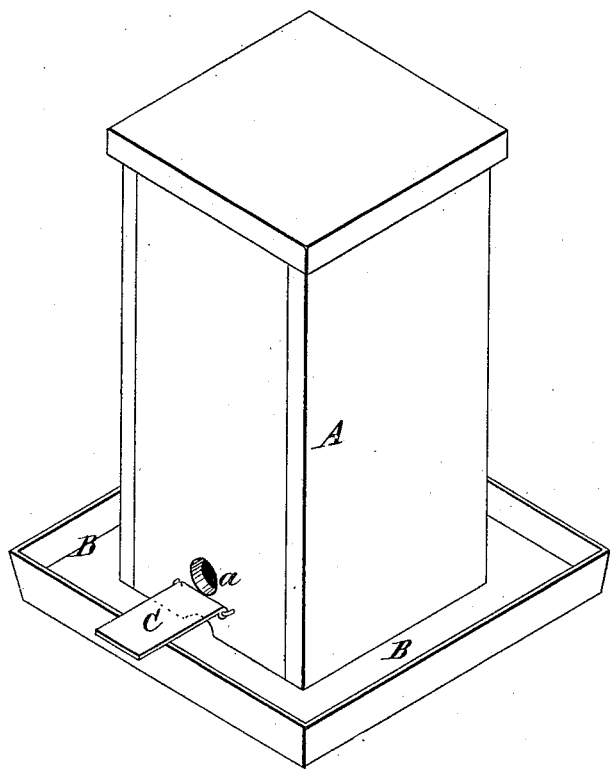

J. R. SPEARMAN.
Bee-Hive.

No. 205,585. Patented July 2, 1878.

WITNESSES:
Henry N. Miller
C. Sedgwick

INVENTOR:
J. R. Spearman
BY Munn & Co
ATTORNEYS.

UNITED STATES PATENT OFFICE.

JOHN R. SPEARMAN, OF SILVER STREET, SOUTH CAROLINA.

IMPROVEMENT IN BEE-HIVES.

Specification forming part of Letters Patent No. 205,585, dated July 2, 1878; application filed April 25, 1878.

*To all whom it may concern:*

Be it known that I, JOHN R. SPEARMAN, of Silver Street, in the county of Newberry and State of South Carolina, have invented a new and useful Improvement in Bee-Hives, of which the following is a specification:

The object of my invention is to furnish a simple and effective device for protecting bees from the destructive moths which enter the hives, and, depositing their eggs at the bottom of the hive or stand, gradually work upward under cover of their own webs until they reach the honey-comb and cause the bees to abandon the hive.

The invention will first be described in connection with the drawing, and then pointed out in the claim.

Figure 2:
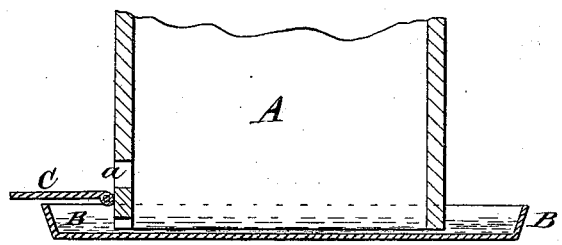

In the accompanying drawing, Figure 1 represents a perspective view of my improved bee-protecting and moth-exterminating device. Fig. 2 is a vertical section of the same.

Similar letters of reference indicate corresponding parts.

A is the hive or bee-stand, and *a* the hole in the same through which the bees enter. B is a shallow trough, made of zinc or other suitable water-tight material, and so much larger than the hive A that when it is filled with water and the hive placed in the trough there will be a water-space completely surrounding the hive A.

C is the platform on which the bees enter the hive, and is hinged with one end to the hive a little below the entrance-opening *a*, so that it can be raised to close the entrance *a* (if so should be desired) at night, when the moths mostly begin their work; or it can be let down upon the edge of the trough B, as a bridge for the bees to enter on.

Prevented by the surrounding water-space, the moths can only enter the stand A through the same opening *a* as the bees, and those entering will be drowned (as will also their eggs, if they deposit any) in the water-trough under the stand or hive.

I have tried this my device, and found it a most effective exterminator of the bee-moth and protector of the bees.

Having thus described my invention, I claim as new and desire to secure by Letters Patent—

The combination, with a bottomless hive having bee-entrance *a*, of a surrounding water-pan, B, the hive being placed in the pan to bring the water within the hive, as shown and described.

JOHN ROBERSON SPEARMAN.

Witnesses:
W. H. WALLACE,
G. B. COOK.